Nov. 28, 1950  S. W. WOOLSEY  2,531,760
JET PROPELLED ROTARY ACTION SUBMARINE MUD GUN
Filed March 12, 1947  2 Sheets-Sheet 1
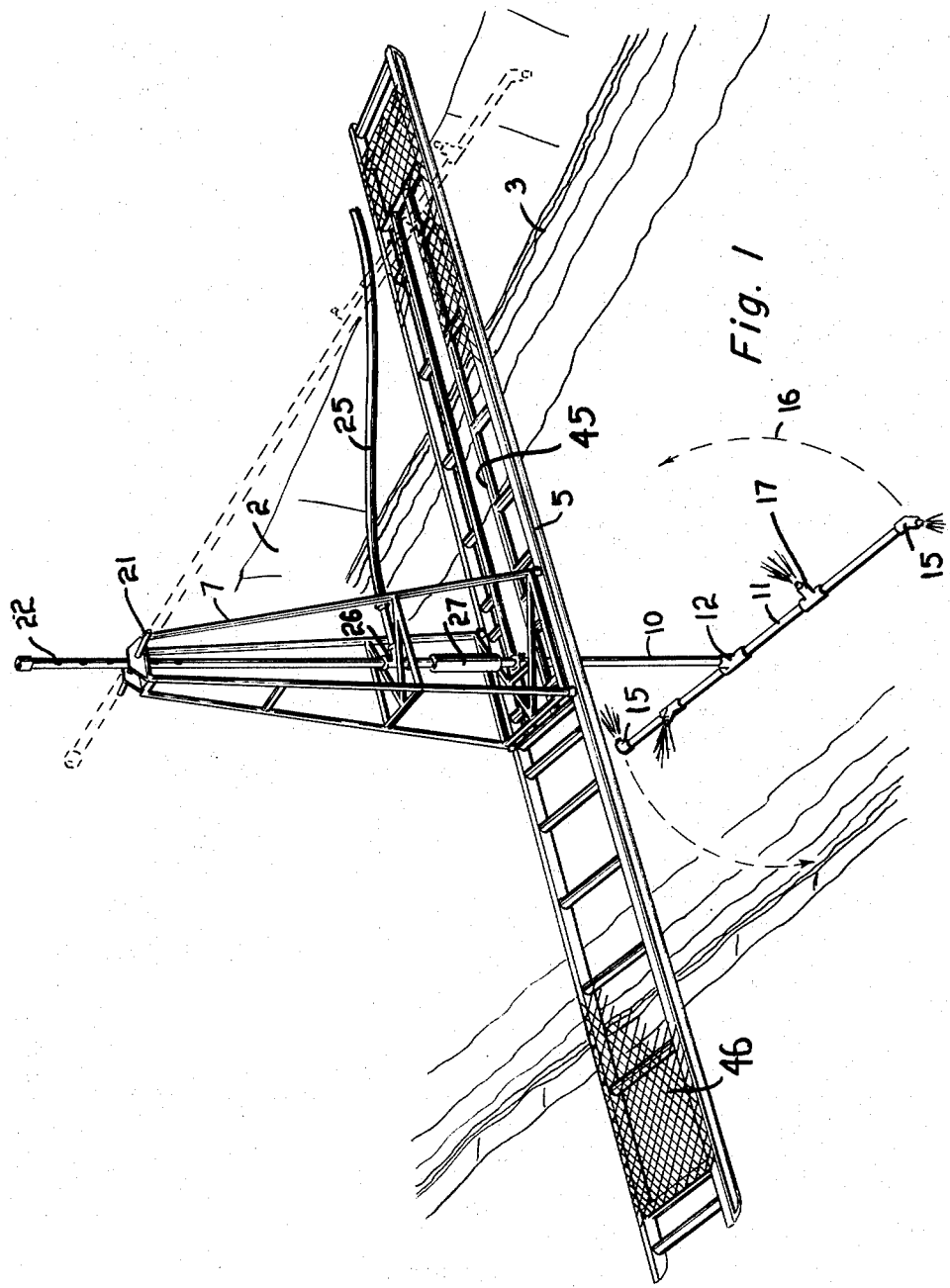
S. W. WOOLSEY
INVENTOR.
BY Lester B Clark
& Ray L Smith
ATTORNEYS

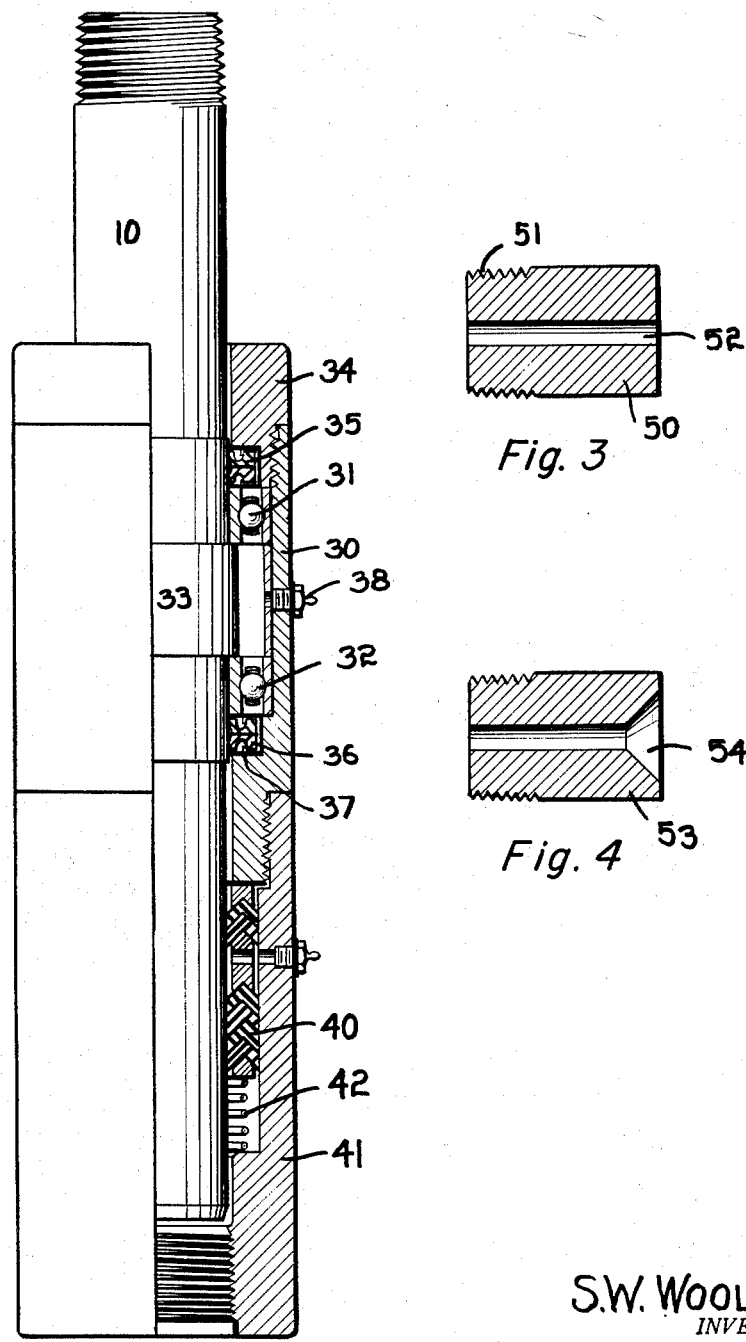

Patented Nov. 28, 1950

2,531,760

UNITED STATES PATENT OFFICE 2,531,760

JET PROPELLED ROTARY ACTION SUBMARINE MUD GUN

Sterling Wilson Woolsey, Corpus Christi, Tex.

Application March 12, 1947, Serial No. 734,016

3 Claims. (Cl. 259—24)

The invention relates to a gun for accomplishing the mixing of the various ingredients such as liquids or liquids and solids where a uniform intimate mixture is desired. One such use is the mixing of the materials which make up the drilling mud circulated into and out of the well bore in the rotary method of drilling.

It is often necessary during the procedure of drilling a well by the rotary method to vary the weight, viscosity, and gel strength of the drilling mud so that it is not uncommon to add various ingredients such as mud heaviers, viscosity reducing chemicals, sliming materials which may be either liquids or solids. It is desirable to intimately mix such materials with the drilling mud so as to obtain a homogeneous mixture and as stated the present invention is adapted for such use.

A drilling mud used in the drilling of a well is usually compounded in a pit known as the slush pit, into which the mud returning from the well bore discharges and from which pit the slush pump intake picks up the mud to be pumped back into the well bore.

It is not intended that the invention be limited to the mixing of mud in rotary drilled oil wells, but that it may be applied just as effectively to the mixture of any liquids, or chemicals, or liquids and solids, where the thorough mixing and maintenance of a thoroughly mixed condition of the various ingredients must be maintained.

The present invention therefore contemplates an apparatus to be used in the slush pit to insure the intimately mixing of the materials regardless of whether the mud is to be taken thinned or to be made heavier or to be made lighter.

It is one of the objects of the invention to provide a mud gun which will be driven by the force of the material being added to the drilling mud.

It is another object of the invention to connect a rotary mud gun to a suitable pumping mechanism so that mud picked up from the slush pit may be forced through the gun with a mixing action to be combined with mud in the slush pit.

Another object of the invention is to provide a rotary mud gun for slush pits to facilitate the adding of materials to the drilling mud.

Still another object of the invention is to provide a gun by which either liquid or dry materials may be mixed together and uniformly distributed in a pit, tank or other enclosure.

Another object of the invention is to provide a device which will straddle the slush pit used in the rotary method of drilling wells and by which various materials may be added to the mud in the pit.

Another object of the invention is to provide a support member or ladder generally termed a catwalk for slush pits whereby a rotary mud gun may be supported in a tiltable position in the pit.

Other and further objects of the invention will be readily apparent when the following description is considered in conenction with the accompanying drawing, wherein:

Fig. 1 is a diagrammatic view illustrating a rotary mud gun supported across the mud pit in position for operation.

Fig. 2 is a vertical sectional view of the conducting pipe of the mud gun and the swivel which supports the gun.

Figs. 3 and 4 are longitudinal sectional views of different types of jet nozzles which may be used with the mud gun.

In Fig. 1 the slush pit in which the drilling mud is permitted to settle before it is recirculated into the well is illustrated generally by the bank 2 which forms the edge of the pit.

The drilling mud 3 is shown in the pit ready to be picked up by the intake of a suitable pumping mechanism which is not here illustrated but which is well known and common with every rotary drilling rig for circulating the drilling mud.

A support member or ladder generally known as a catwalk is shown at 5 extending across the slush pit and resting upon the opposite banks thereof. This catwalk supports a miniature derrick 7 which is tiltable relaitve to the ladder so that it may be tilted to the left as seen in Fig. 1. This derrick supports a conduit pipe 10 through which the materials to be added to the drilling mud may be forced into the cross-head 11 which is connected by a T 12 to the lower end of the conduit pipe 10.

This cross-head 11 is in the form of a transverse pipe relative to the conduit 10 and will have one or more driving jets 15 on the opposite ends thereof which are oppositely facing so that the reaction from the liquid discharging from the jets in the drilling mud 3 will cause the cross-head to rotate as indicated by the dotted line 16. In order to additionally spray the material being added to the drilling mud, one or more mixing jets 17 may be arranged intermediate the pipe 10 and the driving jets 15. Fig. 1 shows these mixing jets as directed forwardly and upwardly so as to spray the material discharging therefrom over the surface of the mud if the cross-head or gun is disposed above the surface of the mud 3. A pipe 10 is vertically adjustable in the derrick by positioning the bar 21 in any one of the openings 22. In this manner the cross-head 11 or gun portion of the device can be arranged above the surface of the drilling mud in the pit or disposed below the surface as may be desired. The portion of the gun may depend upon the materials which are being added to the drilling mud.

In order to introduce the materials into the pipe 10, a hose connection 25 is attached to a T 26 on the pipe above the swivel portion 27. This hose connection 25 will be connected to the discharge portion of either the pumps used for circulating the drilling mud or to a separate pump which may be used for operating the mud gun. The intake of such gun will be lowered into the slush pit. Any suitable arrangement may be made which introduces either dry or liquid materials into the intake or discharge pump as may be desired.

The swivel 27 is best seen in Fig. 3 in the form of a housing 30 which carries an upthrust bearing 31 and a downthrust bearing 32 on opposite sides of a collar 33 fixed on the conduit pipe 10. In this manner the pipe 10 is rotatably supported in the swivel. The top of the housing 30 is closed by a gland 34 which retains the packing 35. A lower packing 36 is seated on a shoulder 37 in the housing 30. A suitable fitting 38 serves for the introduction of lubricating material into the interior of the housing 30. In order to insure a seal about the pipe, another set of packings 40 are arranged in the nipple 41 which forms a lower portion of the swivel. This lower packing may be urged to sealing position by a spring 42.

In some instances, it may be desirable to elevate the cross-head or gun portion 11 of the device above the drilling mud and with this in view, the catwalk 5 is arranged with a longitudinal opening 45 which will allow the raising of the mud gun above the catwalk when the derrick 7 is tilted toward a horizontal position. Any type of suitable flooring 46 may be arranged on the catwalk.

Fig. 3 shows a nozzle member 50 which is threaded at 51 for connection with the cross-head 11. This nozzle has a central opening 52 which may be of a suitable size, depending on the volume of material to be discharged.

Figure 4 shows another type of such nozzle at 53 which has a flared opening 54 at its outer end in order to obtain a spray or discharge of the material.

While a single derrick and mixing gun have been shown, it is to be understood that a multiple arrangement may be used, including one or more cross arms, depending on the depth of the container.

Broadly the invention contemplates a submarine rotary action mixing gun for obtaining an intimate mixture of either liquids or liquids and solid materials. A particular use is in the compounding the drilling mud in the rotary method of drilling.

What is claimed is:

1. For use in combination with a rotary drilling mud pit of a catwalk arranged to span and rest on the edges of the pit, a derrick mounted on said walk, a mud materials discharge pipe, means to mount said pipe in said derrick, said means including a tilting and vertically adjustable connection, a supply pipe connected to said discharge pipe, means to force a stream of mud through said supply pipe, a jet propelled crosshead, a rotatable connection for said head on said discharge pipe so that the jet reaction of the discharging mud is the sole source of power for rotating said head to effect mixing of the incoming materials with the mud in the pit.

2. For use in combination with a rotary drilling mud pit of a catwalk arranged to span and rest on the edges of the pit, a derrick mounted on said walk, a mud materials discharge pipe, means to mount said pipe in said derrick, said means including a tilting and vertically adjustable connection, a supply pipe connected to said discharge pipe, means to force a stream of mud through said supply pipe, a jet propelled crosshead, a rotatable connection for said head on said discharge pipe so that the jet reaction of the discharging mud is the sole source of power for rotating said head to effect mixing of the incoming materials with the mud in the pit, and a slot in said catwalk for the tilting of said pipe to elevate said crosshead from the mud in the pit.

3. A jet propelled rotary action submarine mud gun for mixing mud in the pit in the rotary method of drilling wells comprising a support member arranged to straddle and rest on the edges of the existing pit, a derrick thereon, a pipe adjustably supported in said derrick, a mud connection to said pipe, a swivel rotatably supported on said pipe, a cross head on said pipe to be suspended in the mud to be mixed, and means to force a stream of mud through said connection, swivel and cross head to discharge therefrom where the reaction of said discharging liquid is the sole source of power to effect rotation of the cross head, said swivel including upward and downward thrust bearings and packing means to seal the swivel on said pipe, and additional means to inject lubricant between each said bearings and said packing.

STERLING WILSON WOOLSEY.

REFERENCES CITED

The following references are of record in the file of this patent:

UNITED STATES PATENTS

| Number | Name | Date |
| --- | --- | --- |
| 833,658 | Auchu | Oct. 16, 1906 |
| 1,156,946 | Vandercook | Oct. 19, 1915 |
| 2,096,174 | Hamill | Oct. 19, 1937 |
| 2,118,908 | Vermillion | May 31, 1938 |
| 2,300,987 | Steele et al. | Nov. 3, 1942 |